(12) United States Patent
Stewart

(10) Patent No.: US 7,958,730 B2
(45) Date of Patent: Jun. 14, 2011

(54) CONTROL OF DUAL STAGE TURBOCHARGING

(75) Inventor: Gregory E. Stewart, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 843 days.

(21) Appl. No.: 11/455,444

(22) Filed: Jun. 19, 2006

(65) Prior Publication Data
US 2007/0151243 A1 Jul. 5, 2007

Related U.S. Application Data

(60) Provisional application No. 60/755,351, filed on Dec. 30, 2006.

(51) Int. Cl.
F02B 33/44 (2006.01)
F02B 33/00 (2006.01)

(52) U.S. Cl. ........ 60/612; 60/605.1; 60/605.2; 123/562

(58) Field of Classification Search .................. 60/605.1, 60/598–602, 612, 614, 615, 605.2; 123/562
See application file for complete search history.

(56) References Cited

U.S. PATENT DOCUMENTS

| 3,250,068 | A | * | 5/1966 | Vulliamy | 60/602 |
|---|---|---|---|---|---|
| 3,941,104 | A | | 3/1976 | Egli | 123/119 |
| 4,299,090 | A | * | 11/1981 | Deutschmann | 60/612 |
| 5,063,744 | A | * | 11/1991 | Ishiyama et al. | 60/600 |
| 5,081,842 | A | | 1/1992 | Sugiyama et al. | 60/612 |
| 5,142,866 | A | * | 9/1992 | Yanagihara et al. | 60/605.2 |
| 5,144,803 | A | | 9/1992 | Yoshioka et al. | 60/612 |
| 5,154,057 | A | | 10/1992 | Yoshioka et al. | 60/612 |
| 5,154,058 | A | | 10/1992 | Mizuno | 60/612 |
| 5,168,707 | A | | 12/1992 | Yoshioka et al. | 60/612 |
| 5,186,005 | A | | 2/1993 | Yoshioka et al. | 60/600 |
| 5,277,029 | A | | 1/1994 | Kidokoro et al. | 60/612 |
| 6,076,353 | A | | 6/2000 | Freudenberg et al. | 60/605.2 |
| 6,311,493 | B1 | | 11/2001 | Kurihara et al. | 60/600 |
| 6,418,721 | B1 | * | 7/2002 | Coleman et al. | 60/605.1 |
| 6,550,247 | B1 | | 4/2003 | Gladden | 60/612 |
| 6,658,848 | B1 | * | 12/2003 | Pierpont | 60/602 |

(Continued)

FOREIGN PATENT DOCUMENTS

WO    WO 01/69045    9/2001

OTHER PUBLICATIONS

Sturm, W.L., et al. "Development and Testing of a HD Diesel Engine with Two-Stage Turbocharging." Aachener Kolloquium Fahrzeug- und Motorentechnik 2000. pp. 1-18.
Stefanopoulou, Anna G., et al. "Control of Variable Geometry Turbocharged Diesel Engines for Reduced Emissions." IEEE Transactions on Control Systems Technology, vol. 8, No. 4, Jul. 2000. pp. 733-745.

(Continued)

Primary Examiner — Thai Ba Trieu
(74) Attorney, Agent, or Firm — Richard S. Roberts

(57) ABSTRACT

The invention concerns turbochargers, or more particularly to multivariable dual stage series turbochargers having two degrees of freedom. A multistage series turbocharger apparatus has a low pressure turbocharger comprising a low pressure compressor and a low pressure turbine; a high pressure turbocharger comprising a high pressure compressor and a high pressure turbine, and a exhaust gas recirculation device. A controller controls the operation of at least two of the low pressure compressor, high pressure compressor, low pressure turbine, high pressure turbine, and exhaust gas recirculation device such that at least one operating parameter is maintained at about a selected value.

43 Claims, 8 Drawing Sheets

U.S. PATENT DOCUMENTS

| | | | | |
|---|---|---|---|---|
| 6,694,736 B2* | 2/2004 | Pfluger | ............................ | 60/612 |
| 6,801,846 B1 | 10/2004 | Rodriguez et al. | ............ | 701/102 |
| 6,981,375 B2* | 1/2006 | Sisken et al. | ..................... | 60/612 |
| 7,045,913 B2* | 5/2006 | Ebrahim et al. | ................. | 290/52 |
| 7,165,403 B2* | 1/2007 | Sun et al. | ......................... | 60/612 |
| 2006/0059910 A1* | 3/2006 | Spaeder et al. | ................. | 60/612 |
| 2006/0112928 A1* | 6/2006 | Coleman et al. | .............. | 123/305 |
| 2007/0089416 A1* | 4/2007 | Weber et al. | ................. | 60/605.2 |

OTHER PUBLICATIONS

Moraal, Paul, et al. "Turbocharger Modeling for Automotive Control Applications." SAE Technical Paper Series. 1999-01-0908; International Congress and Expostion, Detroit, Michigan, Mar. 1-4, 1999.

Kolmanovsky, Ilya, et al. "Issues in Modelling and Control of Intake Flow in Variable Geometry Turbocharged Engines." 18th IFIP Conference on System Modelling and Optimization.

* cited by examiner

CONTROL OF DUAL STAGE TURBOCHARGING

CROSS REFERENCE TO RELATED APPLICATION

This application claims the benefit of provisional patent application Ser. No. 60/755,351 filed Dec. 30, 2006, which is incorporated herein by reference.

BACKGROUND OF THE INVENTION

1. Field of the Invention

The present invention relates to turbochargers, or more particularly to multivariable dual stage series turbochargers having at least two degrees of freedom.

2. Description of the Related Art

Multi-stage, in particular dual, series turbocharging is an emerging and important technology. However, the control of multivariable turbo systems pose some problems. A dual stage turbocharger has two degrees of freedom whereas a single stage turbo has only one degree of freedom that is relatively straightforward to set.

The present invention concerns multistage series turbochargers, as opposed to parallel turbochargers, from a feedback control point of view. The invention can use the turbocharger to control to setpoints on various variables rather than the prior art switching or ad hoc strategies. For example, on a single stage turbocharger with variable nozzle vanes (VNT) actuators on the turbine, a relatively common activity is to manipulate the VNT vanes to control the boost pressure, as measured by a manifold air pressure sensor, to achieve a desired setpoint. This invention uses a series turbocharger with VNT vane actuators on both the high pressure (HP) turbine and the low pressure (LP) turbine and exploiting the two degrees of freedom to control the engine. The dual stage turbocharger is a mechanical device that brings an additional degree of freedom to the turbocharger and therefore it is possible to control to two setpoints. Usually this will be boost pressure plus one other variable.

U.S. Pat. No. 3,941,104 discloses the mechanical design of a series turbocharger. U.S. Pat. No. 4,299,090 discloses parallel turbochargers where the main control is by using valves to shut down one turbo in certain circumstances. No real attempt at optimal coordination of the two turbos is made. U.S. Pat. No. 5,063,744 describes a dual series turbocharger with a bypass valve on the HP turbine where the actuators are ramped at two different rates. U.S. Pat. No. 5,186,005 follows a procedure of shutting down one turbocharger in certain cases as defined by measured air flow, pressure etc. This approach uses an on/off logic for switching between one turbocharger operation to two turbocharger operation. U.S. Pat. No. 6,311,493 shows two turbochargers in series with two actuator options, namely a bypass valve on a high-pressure turbine, or bypass valves on high-pressure turbine and a low-pressure turbine. The control uses a feed forward schedule rather than feedback control to the setpoint. U.S. Pat. No. 6,550,247 uses multiple parallel turbochargers where a specific VNT turbine vane actuator is constrained to move between discrete steps. The disclosure proposes a sequential movement to minimize disruption into engine. U.S. Pat. No. 6,801,846 uses two turbochargers in series where an actuator is a bypass valve around one of the turbines. The control portion of computes a setpoint for this valve based on measured engine parameters such as speed, pressure etc.

By contrast, the present invention continually moves the turbocharger actuators to continually work to drive sensor measurements to their setpoint targets. The need of dual-stage turbocharging is to coordinate small and large turbochargers in an effort to obtain the benefits of both. Traditional single stage turbocharging must achieve a tradeoff between conflicting objectives. A fast response in boost pressure ($p_i$) requires a small turbocharger with low inertia while high boost pressures require a large turbocharger. Fuel economy requires a large turbocharger. A dual turbocharged system requires a careful scheduling and coordination of turbocharger action in order to ensure obtaining the benefits while avoiding the disadvantages. This invention presents a control strategy to provide coordinated multi-stage turbocharging using a variety of actuator and sensor configurations.

SUMMARY OF THE INVENTION

The invention provides a multistage series turbocharger apparatus which comprises:

a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $x_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $x_e$ and $x_{21}$ are variable; and a controller for controlling the operation of at least two of the low pressure compressor, high pressure compressor, low pressure turbine and high pressure turbine, such that at least one of parameters $x_i$, $x_{12}$, $x_e$ and $x_{21}$ is maintained at about a selected value.

The invention also provides a multistage series turbocharger apparatus which comprises:

a low pressure turbocharger comprising a low pressure compressor and a low pressure turbine; a high pressure turbocharger comprising a high pressure compressor, a high pressure turbine, and an exhaust gas recirculation device; the low pressure turbocharger being connected in series with the high pressure turbocharger such that the low pressure compressor admits ambient air at an air input at a parameter $x_a$ and discharges the air to the high pressure compressor at a parameter $x_{12}$, which high pressure compressor discharges the air at a parameter $x_i$ to an input path of an intake manifold of an internal combustion engine; and which high pressure turbine admits exhaust gas from an exhaust manifold of the internal combustion engine via an exhaust path of the engine at a parameter $x_e$ and which high pressure turbine discharges the exhaust gas to the low pressure turbine at a parameter $x_{21}$, which low pressure turbine discharges the exhaust gas to an exhaust; and which exhaust gas recirculation device is connected to the exhaust path and to the intake path and delivers exhaust gas from the exhaust path to the intake path at a parameter $x_{egr}$, wherein the operation of at least two of the low pressure compressor, high pressure compressor, low pressure turbine, high pressure turbine, and exhaust gas recirculation device are variable such that at least two of parameters $x_i$, $x_{12}$, $x_e$, $x_{21}$, and $x_{egr}$ are variable; and a controller for controlling the operation of at least two of the low pressure compressor, high pressure compressor, low pressure turbine, high pressure turbine, and exhaust gas recirculation device such that at least one of parameters $x_i$, $x_{12}$, $x_e$, $x_{21}$, and $x_{egr}$ is maintained about a selected value.

The invention further provides method for controlling multistage series turbochargers which comprises:

a) providing a multistage series turbocharger apparatus which comprises:

a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $x_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $x_e$ and $x_{21}$ are variable; and a controller for controlling the operation of at least two of the low pressure compressor, high pressure compressor, low pressure turbine and high pressure turbine, such that at least one of parameters $x_i$, $x_{12}$, $x_e$ and $x_{21}$ is maintained at about a selected value; and b) controlling the operation of at least two of the low pressure compressor, high pressure compressor, low pressure turbine and high pressure turbine, such that at least one of $x_i$, $x_{12}$, $x_e$ and $x_{21}$ is maintained about a selected value.

The invention still further comprises an internal combustion engine arrangement which comprises:

a) an internal combustion engine having an air intake manifold and an exhaust manifold; and b) a multistage series turbocharger apparatus which comprises:

a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $x_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $x_e$ and $x_{21}$ are variable; and a controller for controlling the operation of at least two of the low pressure compressor, high pressure compressor, low pressure turbine and high pressure turbine, such that at least one of parameters $x_i$, $x_{12}$, $x_e$ and $x_{21}$ is maintained at about a selected value.

DESCRIPTION OF THE INVENTION

This invention presents a control strategy to provide coordinated multi-stage turbocharging using a variety of actuator and sensor configurations.

Figure 1:
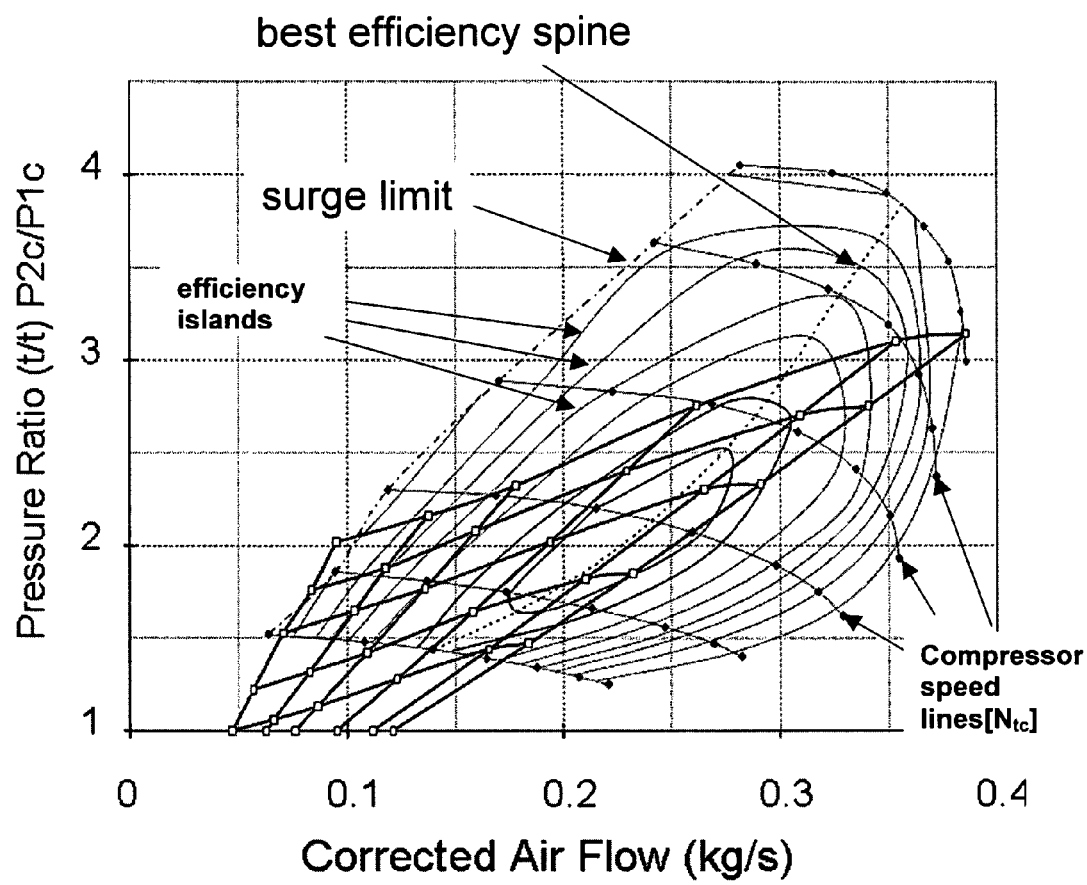
FIG. 1 shows a typical compressor map.

A compressor map is a useful tool to visualize what is meant by an ideal state for a compressor. This is shown in FIG. 1. A compressor map illustrates graphically the relationship between the compressor speed, its efficiency, the boost pressure it provides and the air flow through the compressor. Typically boost pressure is plotted on the y-axis and mass air flow on the x-axis. Given the value of any two in the group containing speed, pressure ratio, and mass air flow, one is able to use the compressor map to calculate the remaining parameters. In traditional single stage turbocharging, the compressor is expected to provide an elevation in boost pressure, as denoted by the pressure ratio on the vertical axis of the compressor map. It is desirable to run the single turbocharger such that the compression efficiency is high—thus leading to cooler compressed air given to the engine. The efficiency islands are illustrated on the compressor map. It is necessary to keep the single turbocharger speed $N_{tc}$ below a certain upper threshold in order to prevent damage to the compressor due to the centrifugal forces developed when overspeeding the turbo. The constant speed lines are illustrated on the compressor map. In multistage turbocharging, there will be a compressor map for each compressor. The overall performance of a multistage turbocharger will be a combined function of all of these maps. In the compressor map, the vertical axis is the pressure ratio (PR>1) which indicates pressure rise. The horizontal axis is the air flow ($W_c$) through the compressor. Contours of constant compressor speed ($N_{tc}$) are illustrated. Given measurements of any two of (PR, $W_c$, $N_{tc}$), it is theoretically possible to compute the value of the third from the compressor map and also to compute the compressor efficiency h.

Figure 2:
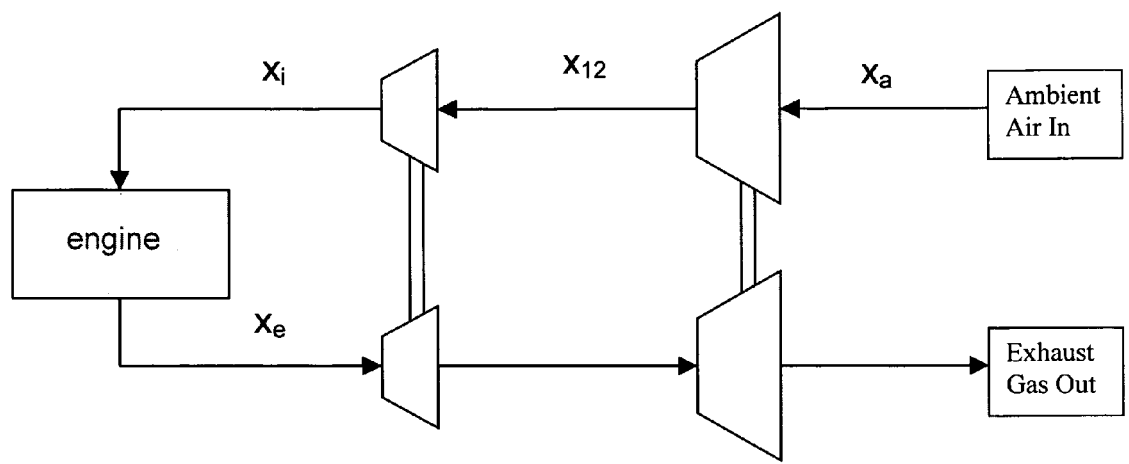
FIG. 2 shows basic layout of a dual-stage turbocharger.

The basic layout of a dual-stage turbocharger is illustrated in FIG. 2. In FIG. 2, C1, T1 denote the low pressure compressor and low pressure turbine of the low pressure (LP) turbocharger and C2, T2 denote the high pressure compressor and high pressure turbine of the high pressure (HP) turbocharger. The parameter $x_a$ is an ambient condition parameter for the low pressure compressor which admits ambient air at a parameter $x_a$ and discharges the air to the high pressure compressor at a parameter $x_{12}$. The high pressure compressor discharges the air at a parameter $x_i$ to an intake manifold of an internal combustion engine, or optionally by a charge air cooler followed by an intake manifold of an internal combustion engine. The high pressure turbine admits exhaust gas from an exhaust manifold of the internal combustion engine at a parameter $x_e$ and which high pressure turbine discharges the exhaust gas to the low pressure turbine at a parameter $x_{21}$. The low pressure turbine discharges the exhaust gas to an exhaust. Parameters $x_i$, $x_{12}$, $x_e$ and $x_{21}$ are independently air pressure, air flow rate, air temperature, air density, exhaust gas pressure, exhaust gas flow rate, exhaust gas temperature, exhaust gas density, and exhaust gas composition such as particulate matter and NOx.

In one embodiment, parameters $x_i$ and $x_{12}$ are air pressure; $x_e$ and $x_{21}$ exhaust gas pressure. In another embodiment, parameters $x_{12}$ and $x_i$ are air flow rate and $x_{21}$ and $x_e$ are exhaust gas flow rate. In another embodiment, parameters $x_{12}$ and $x_i$ are each air temperature and $x_e$ and $x_{21}$ are exhaust gas temperature. In another embodiment parameters $x_{12}$ and $x_i$ are air density and $x_e$, $x_{21}$ are exhaust gas density.

Figure 3:
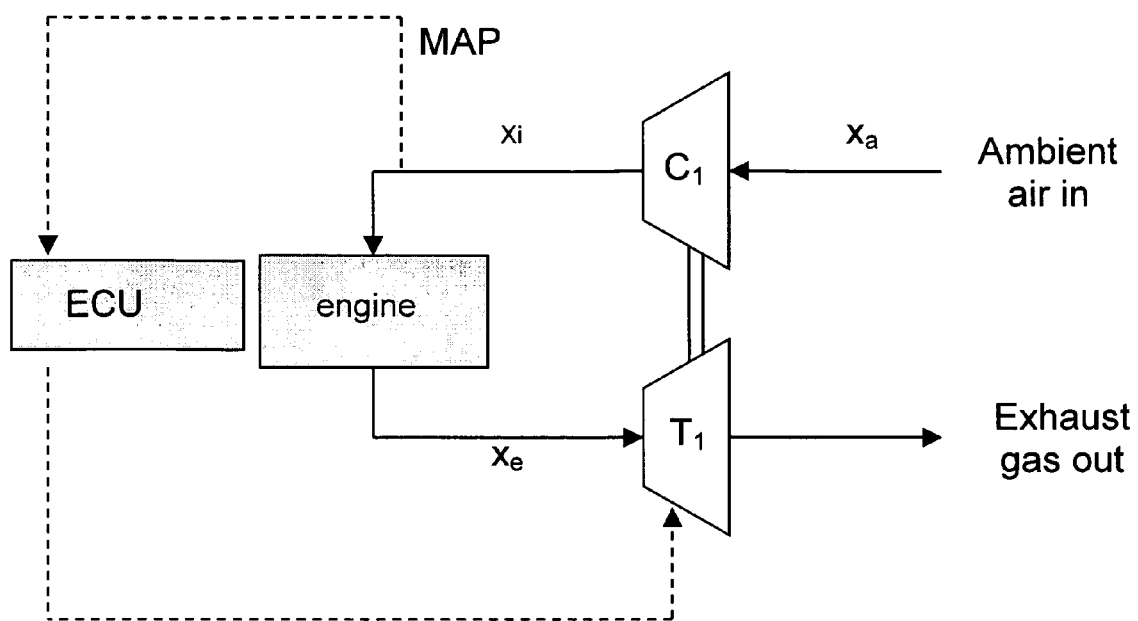
FIG. 3 is a schematic representation of a control layout of a single stage turbocharger.

FIG. 3 is a schematic representation of a control layout of a single stage turbocharger. Typically a pressure sensor provides a measured version of intake manifold pressure $x_i$. The sensor signal manifold air pressure (MAP) is sent to an electronic control unit (ECU). The controller will then compare the MAP to a desired boost pressure and use an algorithm to change an actuator position. Typically this actuator could be an old style wastegate or a newer, more modern actuator having movable turbine vanes in a variable geometry turbine (VGT) or variable nozzle turbine (VNT).

Figure 4:
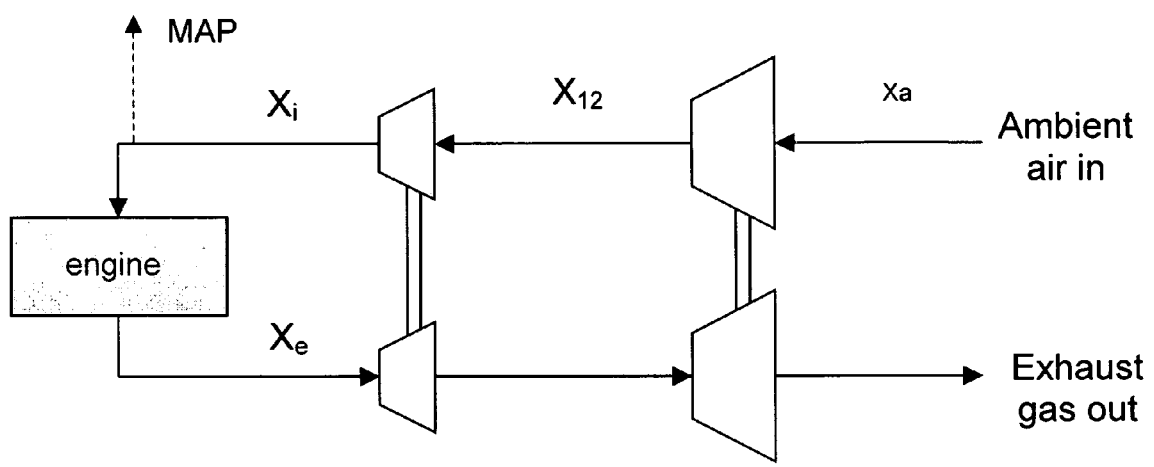
FIG. 4 is a schematic representation of a multi-stage turbocharger.
Figure 5:
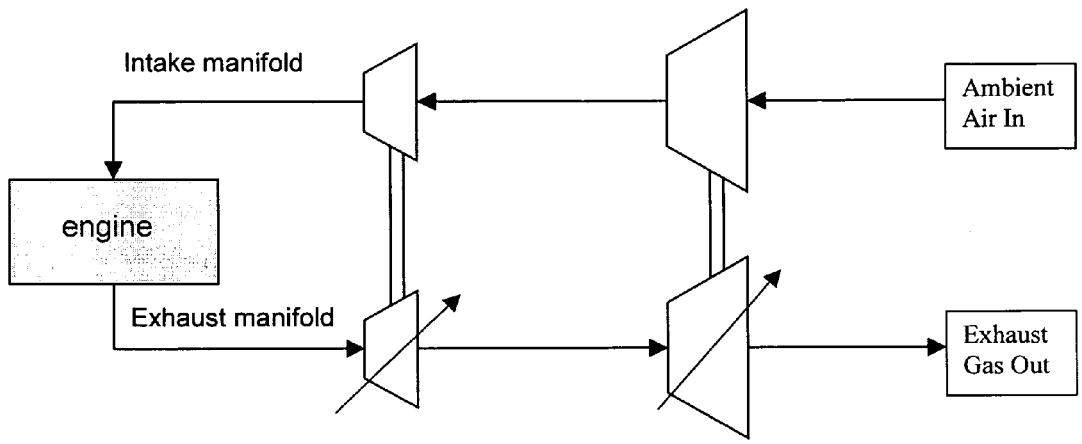
FIG. 5 is a schematic representation of a prior art multi-stage turbocharger showing variable geometry turbines.
Figure 6:
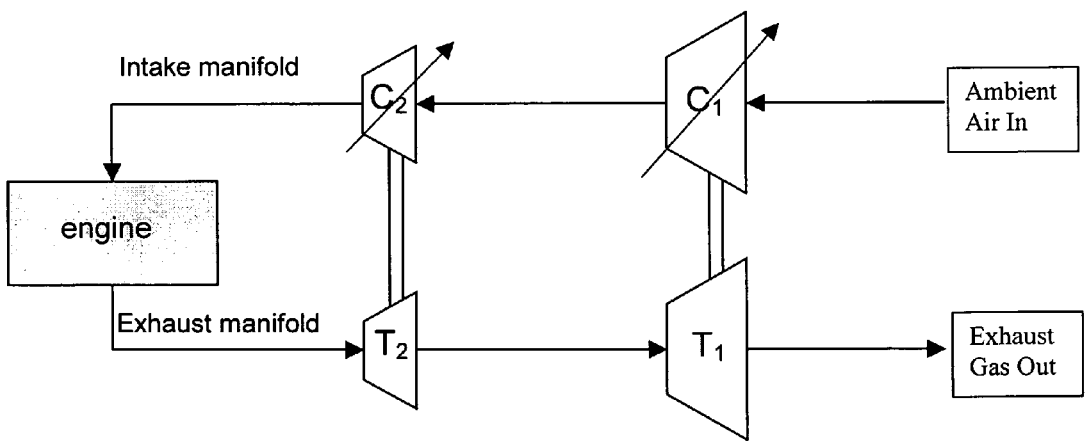
FIG. 6 is a schematic representation of a prior art multi-stage turbocharger showing variable geometry compressors.
Figure 7:
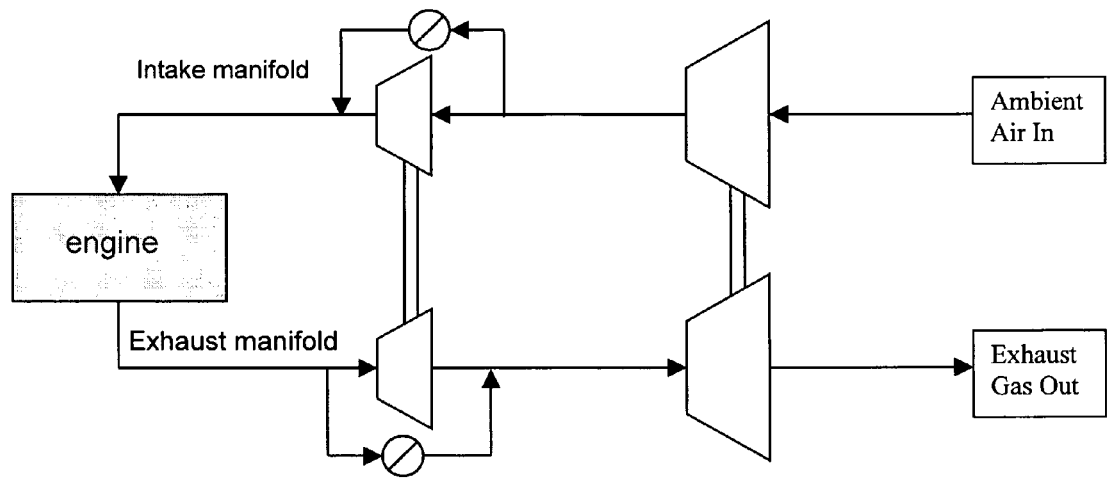
FIG. 7 is a schematic representation of a prior art multi-stage turbocharger showing high-pressure compressor and turbine bypass valves.
Figure 8:
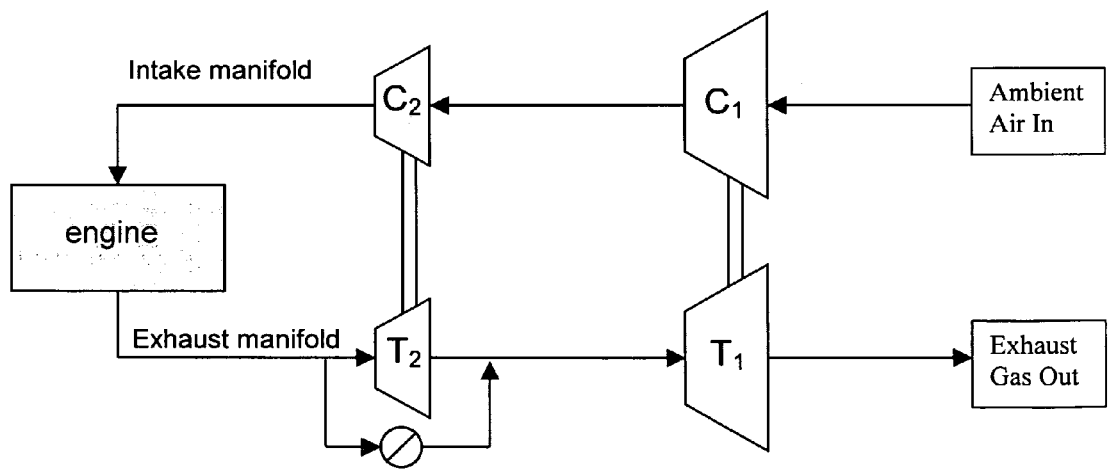
FIG. 8 is a schematic representation of a prior art multi-stage turbocharger showing a high-pressure turbine bypass valve.
Figure 9:
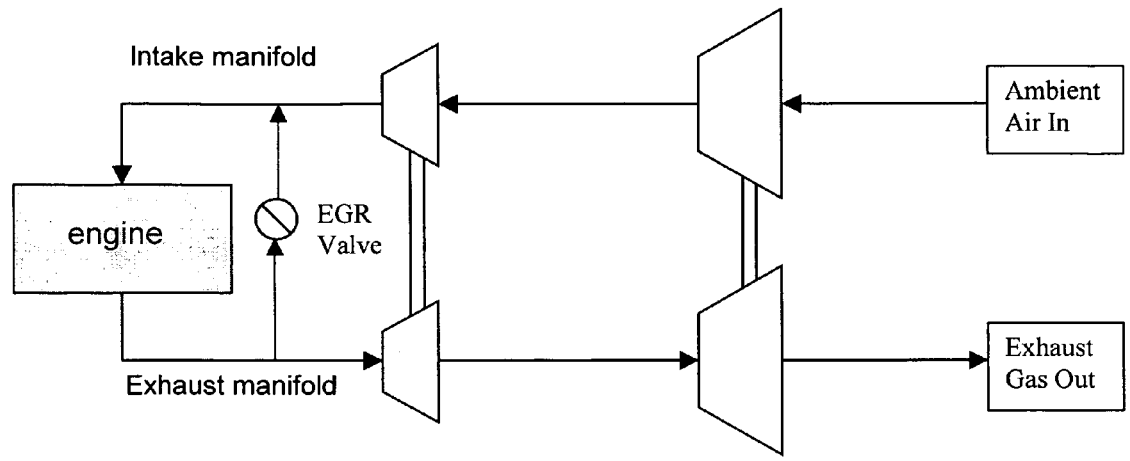
FIG. 9 is a schematic representation of a prior art multi-stage turbocharger showing controlled exhaust gas recirculation (EGR).

FIG. 4 is a schematic representation of a multi-stage turbocharger. Since the goal of turbocharging is to pressurize the air into the engine cylinders, it can be expected that there will still be a desire to maintain the value of the intake manifold pressure to match a setpoint. However, now the number of available degrees of freedom has increased. The invention provides a multivariable control approach with the goal of achieving the desired boost pressure $x_i$, and also ensuring that the remaining degrees of freedom are used in a manner beneficial to the engine performance. Beneficial options include intake manifold variables such as air flow and air temperature; turbocharger variables such as turbo speed; and emissions variables such as particulate matter and NOx. Various methods of controlling multi-stage turbochargers. In this regard, FIG. 5 shows a prior art multi-stage turbocharger showing variable geometry turbines. FIG. 6 shows a prior art multi-stage turbocharger showing variable geometry compressors (VGC). FIG. 7 shows a prior art multi-stage turbocharger showing high-pressure compressor and turbine bypass valves. In the arrangements of FIGS. 5-7, each of the actuator configurations has two degrees of freedom that may be set by the controller. FIG. 8 shows a prior art multi-stage turbocharger having a high-pressure turbine bypass valve. FIG. 9 shows a prior art multi-stage turbocharger having controlled exhaust gas recirculation (EGR). EGR is used in order to reduce NOx emissions in engines. This is not actually a turbocharger actuator, but is often used in induction control.

Figure 10:
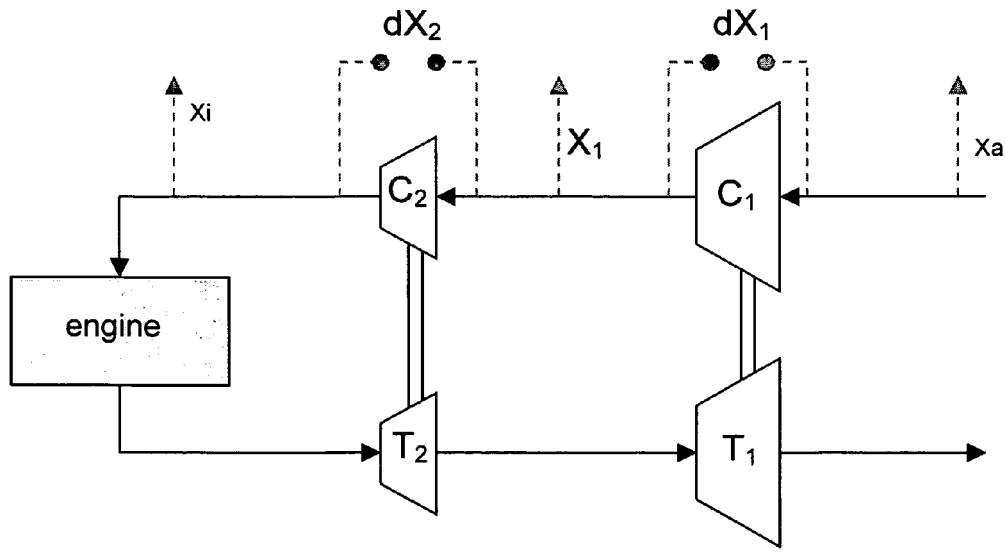
FIG. 10 is a schematic representation of a prior art multi-stage turbocharger showing several sensing options.

The invention proposes a control strategy where one or more of the turbines is outfitted with variable nozzle vanes (VNT) vane position actuators on the turbine blades. Here the assumption is made that the engine controller generates a boost pressure setpoint for the intake manifold pressure $x_i$. Then the control problem is to use the two actuators, i.e. high pressure and low pressure $\{VNT_{hp}, VNT_{lp}\}$ to achieve the target manifold pressure. After achieving this, there remains a degree of freedom in the actuators. The following will address some of the issues in how to set this degree of freedom. FIG. 10 is a schematic representation of multi-stage turbocharger showing several sensing options. In order to control to setpoints on $x_i$ and $x_{12}$, there are several sensing options. These include intake manifold $x_i$ sensor, ambient pressure $x_a$ sensor, and $x_{12}$ pressure sensor; or intake manifold $x_i$ sensor, ambient pressure $x_a$ sensor, differential pressure sensor across $C_2$; or intake manifold $x_i$ sensor, ambient pressure $x_a$ sensor, differential pressure sensor across $C_1$. In order to compute the position on the compressor maps each of these pressure sensing options would require either a standard manifold air flow (MAF) sensor; or two turbospeed sensors one for HP and one for LP; or online emissions sensors for particulate matter and NOx. In one embodiment at least one of the low pressure turbocharger and the high pressure turbocharger comprises variable compressor blades.

Figure 11:
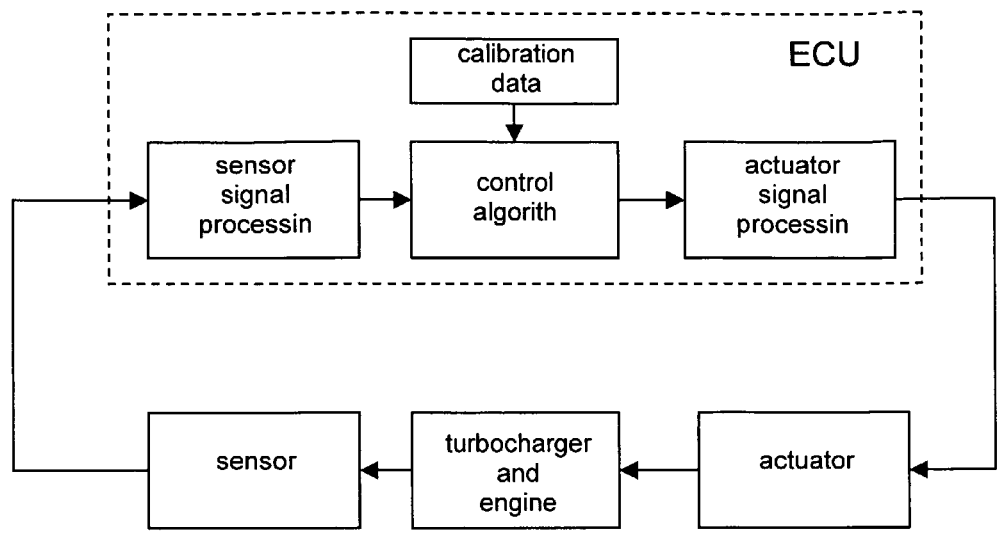
FIG. 11 is a schematic representation of an electronic control unit (ECU) according to the invention.
Figure 12:
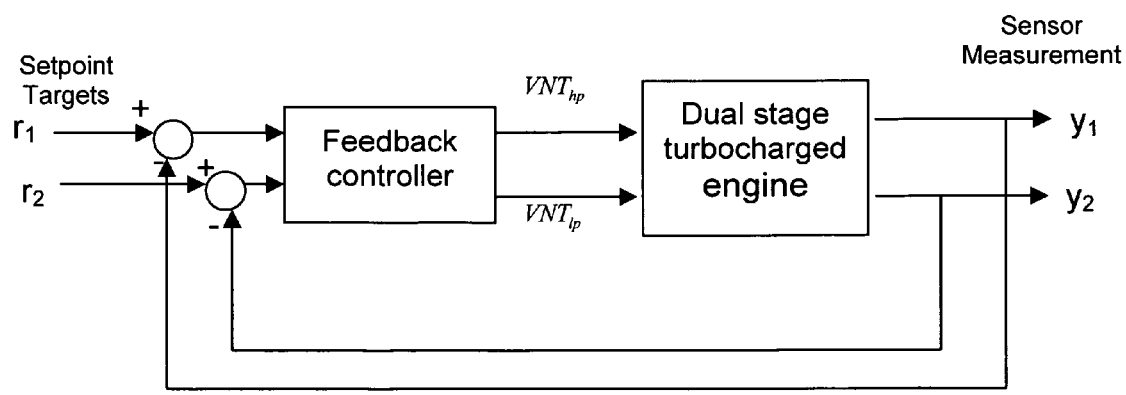
FIG. 12 is a schematic representation of a feedback controller to drive the sensor measurements.

FIG. 11 shows an electronic control unit (ECU) according to the invention. This figure illustrates the basic blocks of the hardware layout according to the invention. Various actuator and sensor combinations and various designs for the control algorithm are selected. The ECU is a digital computer that controls engine (and optionally the transmission, brake or other car system) functions based on data received from various sensors. Examples include Electronic Brake Control Module (EBCM), Engine Control Module (ECM), Powertrain Control Module (PCM) or Vehicle Control Module (VCM), all of which are known in the art. FIG. 12 is a schematic representation of a feedback controller to drive the sensor measurements y1 and y2 to the setpoint targets r1 and r2, by manipulating the actuators $u_1$ and $u_2$ (here $VNT_{hp}$ and $VNT_{lp}$) in real time. A common specification for an engine maker is to control the intake manifold pressure (measured with a MAP sensor) and intake manifold airflow (measured with a MAF sensor). A single stage turbocharger actuator does not have enough degrees of freedom to control both simultaneously. However a dual turbocharger may be able to control intake manifold pressure and flow simultaneously to their setpoint targets. Other options for setpoints include boost pressure and intake manifold temperature; boost pressure and turbocharger speed(s); boost pressure and HP turbocharger responsiveness (midrange control strategy to keep the HP compressor away from the surge line on the compressor map) and control based on emissions measurements. The impact of the VNT actuators is inherently multivariable due to the mechanical nature of the two stage turbocharger and the engine. That is, the $VNT_{lp}$ actuator will impact both pressure and flow, as will the $VNT_{hp}$ actuator (to a different degree). In equations, the multivariable relationship is written as:

$$\begin{bmatrix} MAP \\ MAF \end{bmatrix} = \begin{bmatrix} g_{11} & g_{12} \\ g_{21} & g_{22} \end{bmatrix} \begin{bmatrix} VNT_{hp} \\ VNT_{hp} \end{bmatrix}$$

The feedback Controller Algorithm is designed such that it moves the actuators in a coordinated fashion to achieve both goals. The general functional form of the control algorithm computes both actuator moves as a function of the error $(e(t)=r(t)-y(t))$ in both channels. This will generally require a controller with multivariable interactions:

$$\begin{bmatrix} VNT_{\mathrm{hp}} \\ VNT_{\mathrm{lp}} \end{bmatrix} = \begin{bmatrix} k_{11} & k_{12} \\ k_{21} & k_{22} \end{bmatrix} \begin{bmatrix} e_1 \\ e_2 \end{bmatrix}$$

The overall system includes the following basic components:
A dual stage series turbocharger with at least two independently controlled actuators; an engine such as a diesel engine; sensors (boost pressure, flow etc); an on-board electronic control unit (ECU) receiving sensor signals and writing actuator signals; and a control algorithm inside the ECU which contains the multivariable controller that outputs actuator signals as a function of sensor history and desired setpoint targets for the sensors.

The invention provides the use of a dual stage turbocharger with two independent actuators to control two measurements to two desired setpoints where the two actuators are VNT on the HP and LP turbines; or were the two actuators are variable geometry compressors (VGC) on the HP and LP compressors; or were the two actuators are bypass or wastegate valves on any two of the following components (i) the HP turbine, (ii) the LP turbine, (iii) the HP compressor, and (iv) the LP compressor (v) were the two actuators comprise one wastegated and one VNT turbine.

The invention further provides a dual stage turbocharger with two independent actuators to simultaneously control the intake manifold boost pressure (MAP) and intake manifold air flow MAF to desired setpoints. This is desirable because engine makers would like to be able to specify simultaneous targets for both pressure and flow, but typically are unable to do so with a single stage turbocharger. In one embodiment of the invention, the two actuators are VNT on the HP and LP turbines. In another embodiment, the two actuators are variable geometry compressors (VGC) on the HP and LP compressors. In another embodiment, the two actuators are bypass or wastegate valves on any two of the following components (i) the HP turbine, (ii) the LP turbine, (iii) the HP compressor, and (iv) the LP compressor. In another embodiment, the two actuators comprise one wastegated and one VNT turbine.

The invention further provides dual stage turbocharger with two independent actuators to simultaneously control the intake manifold boost pressure (MAP) and intake manifold air temperature (MAT) to desired setpoints. The increase in air temperature between the ambient air coming into the LP compressor and the temperature of the air in the intake manifold is a measure of the overall efficiency of the two compressors. In one embodiment the two actuators are VNT on the HP and LP turbines. In another embodiment, the two actuators are variable geometry compressors (VGC) on the HP and LP compressors. In another embodiment the two actuators are bypass or wastegate valves on any two of the following components (i) the HP turbine, (ii) the LP turbine, (iii) the HP compressor, and (iv) the LP compressor. In another embodiment the two actuators comprise one wastegated and one VNT turbine.

The invention further provides dual stage turbocharging and exhaust gas recirculation valve as actuators to achieve desired manifold boost pressure (MAP) and EGR flow. The principal EGR actuator is a valve. In one embodiment the actuators comprise the EGR valve, and VNT on the HP and LP turbines. In another embodiment the actuators comprise the EGR valve and variable geometry compressors (VGC) on the HP and LP compressors. In another embodiment the actuators comprise the EGR valve and bypass or wastegate valves on any two of the following components (i) the HP turbine, (ii) the LP turbine, (iii) the HP compressor, and (iv) the LP compressor. In another embodiment the actuators comprise the EGR valve, one wastegated and one VNT turbine. In one embodiment the exhaust gas recirculation device is connected to the exhaust manifold and the intake manifold. In another embodiment, the exhaust gas recirculation device is connected to the exhaust manifold and at a point between the high pressure compressor and low pressure compressor. In another embodiment, the exhaust gas recirculation device is connected to the exhaust manifold and connected at a point between the low pressure compressor and the air input. In another embodiment, the exhaust gas recirculation device is connected to a point between the high pressure turbine and the low pressure turbine and connected at a point between the high pressure compressor and the low pressure compressor. In another embodiment, the exhaust gas recirculation device is connected to a point between the high pressure turbine and the low pressure turbine and at a point between the low pressure compressor and the air input. In another embodiment, the exhaust gas recirculation device is connected at a point between the low pressure turbine and the exhaust, and at a point between the low pressure compressor and the air inlet. In another embodiment, multistage series turbocharger apparatus has an air cooler between the intake manifold and the high pressure turbocharger.

In one form of the invention, the operation of the apparatus is controlled such that the operation of at least two of the low pressure compressor, high pressure compressor, low pressure turbine and high pressure turbine, such that at least one of $x_i$, $x_{12}$, $x_e$ and $x_{21}$ is maintained at about a selected value. In one embodiment of the invention, the operation of the low pressure turbine and the high pressure turbine are variable. In another embodiment of the invention, the operation of the low pressure compressor and the high pressure compressor are variable. In another embodiment of the invention, the operation of the low pressure turbine and the low pressure compressor are variable. In another embodiment of the invention, the operation of the high pressure turbine and the low pressure compressor are variable. In one embodiment of the invention, the low pressure turbine and the high pressure turbine are variable geometry turbines. In another embodiment of the invention, the low pressure compressor and the high pressure compressor are variable geometry compressors. In another embodiment of the invention, the low pressure turbine is a variable geometry turbine and the low pressure compressor is a variable geometry compressor. In another embodiment of the invention, the high pressure turbine is a variable geometry turbine and the low pressure compressor is a variable geometry compressor.

In one embodiment the controlling is conducted with one or more Proportional-Integral-Derivative control loops. In another embodiment the controlling is conducted with one or more predictive constrained control loops. Such predictive constrained control loops may comprise an internal model controller (IMC) such as a Smith predictor. In another embodiment, the controlling comprises one or more multiparametric control loops. The controlling may comprise a dynamic filter "A" followed by a lookup table "B" which is followed by a dynamic filter "C" wherein the dynamic filter "A" pre-processes signals entering lookup table "B" and dynamic filter "C" post-processes signals leaving the lookup table "B". The dynamic filter "A" may be a Kalman filter, an extended Kalman filter, or a state observer filter, and the dynamic filter "C" may be an identity filter. The lookup table may be computed by using multiparametric hybrid algorithm which encodes constraints on a plurality of parameters $x_i$, $x_{12}$, $x_e$ and $x_{21}$ and actuator positions. The lookup table may comprise control constraints as additional parameters. The lookup table may be computed by a suboptimal multiparametric hybrid algorithm. In another embodiment he controlling may comprise one or more model based predictive control loops, one or more dynamic matrix control loops, one or more statistical processes control loops, a knowledge based expert system algorithm, a neural network algorithm or a fuzzy logic algorithm, as are well known in the art. In another form of the invention, a "midrange control strategy" is provided whereby the smaller and faster HP turbocharger controls to a setpoint (e.g. controls MAP sensor to a boost pressure setpoint) and a second setpoint is supplied to the larger and slower LP turbocharger moves such that the HP turbocharger is positioned on the compressor map for fast responsiveness. This has the effect of using the LP turbocharger to position the HP turbocharger in a good position on the compressor map. In practice, the HP turbocharger will move towards the surge line on the compressor map in an effort to achieve the desired boost pressure setpoint. In the midranging strategy, the LP turbocharger would move such that the HP turbocharger moved away from the surge line towards the center of the compressor map. This is known as midranging an actuator and is reasonably common for cases with more actuators than setpoints and measurements. Exemplary control algorithm design techniques non-exclusively include Model predictive control, Multiparametric control, H-infinity or H-2 control, and PID control, as are known in the art. In one form of the invention, an internal combustion engine is provided with an air intake manifold and an exhaust manifold, and having the multistage series turbocharger apparatus attached. While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for controlling multistage series turbochargers which comprises:
    a) providing a multistage series turbocharger apparatus which comprises:
    a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $x_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $x_e$ and $x_{21}$ are variable; sensors for continually measuring at least two of the parameters $x_i$, $x_{12}$, $x_e$ and $x_{21}$; least two independently controlled actuators for continually adjusting at least two of the parameters $x_i$, $x_{12}$, $x_e$ and $x_{21}$; and a multivariable controller having a control algorithm for continually controlling the operation of at least two of the low pressure compressor, high pressure compressor, low pressure turbine and high pressure turbine by continually reading measurement values from the sensors of at least two of the parameters $x_i$, $X_{12}$, $X_e$ and $x_{21}$; continually comparing the measurement values from the sensors of at least two of the parameters $x_i$, $x_{12}$, $x_e$ and $x_{21}$ to selected values, and then adjusting at least two of the parameters $x_i$, $x_{12}$, $x_e$ and $x_{21}$ with at least two actuators, such that at least one of parameters $x_i$, $x_{12}$, $x_e$ and $x_{21}$ is maintained at about a selected value; and
    b) controlling the operation of at least two of the low pressure compressor, high pressure compressor, low pressure turbine and high pressure turbine, with the controller such that at least one of $x_i$, $x_{12}$, $x_e$ and $x_{21}$ is maintained about a selected value.

2. The method of claim 1 wherein the controlling step b) is conducted with one or more Proportional-Integral-Derivative control loops.

3. The method of claim 1 wherein the controlling step b) is conducted with one or more predictive constrained control loops.

4. The method of claim 3 wherein at least one of the predictive constrained control loops comprises an internal model controller.

5. The method of claim 1 wherein the controlling step b) comprises one or more multiparametric control loops.

6. The method of claim 1 wherein the controlling step b) is comprises a dynamic filter "A" followed by a lookup table "B" which is followed by a dynamic filter "C" wherein the dynamic filter "A" pre-processes signals entering lookup table "B" and dynamic filter "C" post-processes Signals leaving the lookup table "B".

7. The method of claim 6 wherein the dynamic filter "A" is a Kalman filter, an extended Kalman filter, or a state observer filter, and the dynamic filter "C" is an identity filter.

8. The method of claim 6 wherein the lookup table is computed by using multiparametric hybrid algorithm which encodes constraints on a plurality of parameters $x_i$, $x_{12}$, $x_e$ and $x_{21}$ and actuator positions.

9. The method of claim 6 wherein the lookup table comprises control constraints as additional parameters.

10. The method of claim 6 wherein the lookup table is computed by a suboptimal multiparametric hybrid algorithm.

11. The method of claim 1 wherein the controlling step b) comprises one or more model based predictive control loops.

12. The method of claim 1 wherein the controlling step b) comprises one or more dynamic matrix control loops.

13. The method of claim 1 wherein the controlling step b) comprises one or more statistical processes control loops.

14. The method of claim 1 wherein the controlling step b) comprises a knowledge based expert system algorithm.

15. The method of claim 1 wherein the controlling step b) comprises a neural network algorithm.

16. The method of claim 1 wherein the controlling step b) comprises a fuzzy logic algorithm.

17. A multistage series turbocharger apparatus which comprises:
    a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $x_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $x_e$ and $x_{21}$ are variable; sensors for continually measuring at least two of the parameters $x_i$, $x_{12}$, $x_e$ and $X_{21}$; at least two independently controlled actuators for continually adjusting at least two of the parameters $x_i$, $x_{12}$, $x_e$ and $x_{21}$; and a multivariable controller having a control algorithm for continually controlling the operation of at least two of the low pressure compressor, high pressure compressor, low pressure turbine and high pressure turbine by continually reading measurement values from the sensors of at least two of the parameters $x_i$, $x_{12}$, $x_e$ and $x_{21}$; continually comparing the measurement values from the sensors of at least two of the parameters $x_i$, $x_{12}$, $x_e$ and $x_{21}$ to selected values, and then adjusting at least two of the parameters $x_i$, $x_{12}$, $x_e$ and $x_{21}$ with at least two actuators, such that at least one of parameters $x_i$, $x_{12}$, $x_e$ and $x_{21}$ is maintained at about a selected value.

18. The apparatus of claim 17 wherein parameters $x_i$, $x_{12}$, $x_e$ and $x_{21}$ are independently selected from the group consisting of air pressure, air flow rate, air temperature, air density, exhaust gas pressure, exhaust gas flow rate, exhaust gas temperature, exhaust gas density, and exhaust gas composition.

19. The apparatus of claim 17 wherein parameters $x_i$ and $x_{12}$ are air pressure, and $x_e$ and $x_{21}$ exhaust gas pressure.

20. The apparatus of claim 17 wherein parameters $x_{12}$ and $x_i$ are air flow rate and $x_{21}$ and $x_e$ are exhaust gas flow rate.

21. The apparatus of claim 17 wherein parameters $x_{12}$ and $x_i$ are each air temperature and $X_e$ and $x_{21}$ are exhaust gas temperature.

22. The apparatus of claim 17 wherein parameters $x_{12}$ and $x_i$ are air density and $x_e$ $x_{21}$ are exhaust gas density.

23. The apparatus of claim 17 wherein at least one of the low pressure turbocharger and the high pressure turbocharger comprises variable nozzle vanes.

24. The apparatus of claim 17 wherein at least one of the low pressure turbocharger and the high pressure turbocharger comprises variable compressor blades.

25. The apparatus of claim 17 wherein at least one of the low pressure turbocharger and the high pressure turbocharger comprises a waste gate.

26. The apparatus of claim 17 wherein at least one of the low pressure turbocharger and the high pressure turbocharger comprises a bypass valve.

27. The apparatus of claim 17 further comprising an air cooler between the intake manifold and the high pressure turbocharger.

28. The apparatus of claim 17 wherein the operation of the low pressure turbine and the high pressure turbine are variable.

29. The apparatus of claim 17 wherein the operation of the low pressure compressor and the high pressure compressor are variable.

30. The apparatus of claim 17 wherein the operation of the low pressure turbine and the low pressure compressor are variable.

31. The apparatus of claim 17 wherein the operation of the high pressure turbine and the low pressure compressor are variable.

32. The apparatus of claim 17 wherein the low pressure turbine and the high pressure turbine are variable geometry turbines.

33. The apparatus of claim 17 wherein the low pressure compressor and the high pressure compressor are variable geometry compressors.

34. The apparatus of claim 17 wherein the low pressure turbine is a variable geometry turbine and the low pressure compressor is a variable geometry compressor.

35. The apparatus of claim 17 wherein the high pressure turbine is a variable geometry turbine and the low pressure compressor is a variable geometry compressor.

36. A multistage series turbocharger apparatus which comprises:
a low pressure turbocharger comprising a low pressure compressor and a low pressure turbine; a high pressure turbocharger comprising a high pressure compressor, a high pressure turbine, and an exhaust gas recirculation device; the low pressure turbocharger being connected in series with the high pressure turbocharger such that the low pressure compressor admits ambient air at an air input at a parameter $x_a$ and discharges the air to the high pressure compressor at a parameter $x_{12}$, which high pressure compressor discharges the air at a parameter $x_i$ to an input path of an intake manifold of an internal combustion engine; and which high pressure turbine admits exhaust gas from an exhaust manifold of the internal combustion engine via an exhaust path of the engine at a parameter $x_e$ and which high pressure turbine discharges the exhaust gas to the low pressure turbine at a parameter $x_{21}$, which low pressure turbine discharges the exhaust gas to an exhaust; and which exhaust gas recirculation device is connected to the exhaust path and to the intake path and delivers exhaust gas from the exhaust path to the intake path at a parameter $x_{egr}$, wherein the Operation of at least two of the low pressure compressor, high pressure compressor, low pressure turbine, high pressure turbine, and exhaust gas recirculation device are variable such that at least two of parameters $x_i$, $x_{12}$, $x_e$, $x_{21}$, and $x_{egr}$ are variable; sensors for continually measuring at least two of the parameters $x_i$, $x_{12}$, $x_e$, $x_{21}$ and $x_{egr}$; least two independently controlled actuators for continually adjusting at least two of the parameters $x_i$, $x_{12}$, $x_e$, $x_{21}$ and $x_{egr}$; and a multivariable controller having a control algorithm for continually controlling the operation of at least two of the low pressure compressor, high pressure compressor, low pressure turbine, high pressure turbine, and exhaust gas recirculation device by continually reading measurement values from the sensors of at least two of the parameters $x_i$, $x_{12}$, $x_e$, $x_{21}$ and $x_{egr}$; continually comparing the measurement values from the sensors of at least two of the parameters $x_i$, $x_{12}$, $x_e$, $x_{21}$ and $x_{egr}$ to selected values, and then adjusting at least two of the parameters $x_i$, $x_{12}$, $x_e$, $x_{21}$ and $x_{egr}$ with at least two actuators, such that at least one of parameters $x_i$, $x_{12}$, $x_e$, $x_{21}$, and $X_{egr}$ is maintained about a selected value.

37. The apparatus of claim 36 wherein the exhaust gas recirculation device is connected to the exhaust manifold and the intake manifold.

38. The apparatus of claim 36 wherein the exhaust gas recirculation device is connected to the exhaust manifold and at a point between the high pressure compressor and low pressure compressor.

39. The apparatus of claim 36 wherein the exhaust gas recirculation device is connected to the exhaust manifold and connected at a point between the low pressure compressor and the air input.

40. The apparatus of claim 36 wherein the exhaust gas recirculation device is connected to a point between the high pressure turbine and the low pressure turbine and connected at a point between the high pressure compressor and the low pressure compressor.

41. The apparatus of claim 36 wherein the exhaust gas recirculation device is connected to a point between the high pressure turbine and the low pressure turbine and at a point between the low pressure compressor and the air input.

42. The apparatus of claim 36 wherein the exhaust gas recirculation device is connected at a point between the low pressure turbine and the exhaust, and at a point between the low pressure compressor and the air inlet.

43. An internal combustion engine arrangement which comprises:
   a) an internal combustion engine having an air intake manifold and an exhaust manifold; and
   b) a multistage series turbocharger apparatus which comprises:
   a low pressure turbocharger comprising a low pressure compressor and a low pressure turbine; a high pressure turbocharger comprising a high pressure compressor and a high pressure turbine; the low pressure turbocharger being connected in series with the high pressure turbocharger such that the low pressure compressor admits ambient air at a parameter $x_a$ and discharges the air to the high pressure compressor at a parameter $X_{12}$, which high pressure compressor discharges the air at a parameter $x_i$ to an intake manifold of an internal combustion engine; and which high pressure turbine admits exhaust gas from an exhaust manifold of the internal combustion engine at a parameter $x_e$ and which high pressure turbine discharges the exhaust gas to the low pressure turbine at a parameter $x_{21}$, which low pressure turbine discharges the exhaust gas to an exhaust; wherein the operation of at least two of the low pressure compressor, high pressure compressor, low pressure turbine and high pressure turbine are variable such that at least two of parameters $x_i$, $x_{12}$, $X_e$ and $x_{21}$ are variable; and sensors for continually measuring at least two of the parameters $x_i$, $x_{12}$, $x_e$ and $x_{21}$; least two independently controlled actuators for continually adjusting at least two of the parameters $x_i$, $x_{12}$, $x_e$ and $x_{21}$; and a multivariable controller having a control algorithm for continually controlling the operation of at least two of the low pressure compressor, high pressure compressor, low pressure turbine and high pressure turbine, by continually reading measurement values from the sensors of at least two of the parameters $x_i$, $x_{12}$, $x_e$ and $x_{21}$; continually comparing the measurement values from the sensors of at least two of the parameters $x_i$, $x_{12}$, $x_e$ and $x_{21}$ to selected values, and then adjusting at least two of the parameters $x_i$, $x_{12}$, $x_e$ and $x_{21}$ with at least two actuators such that at least one of parameters $x_i$, $x_{12}$, $x_e$ and $x_{21}$ is maintained at about a selected value.

* * * * *